US012279186B2

(12) United States Patent
Garg et al.

(10) Patent No.: US 12,279,186 B2
(45) Date of Patent: *Apr. 15, 2025

(54) CALLER IDENTIFIER

(71) Applicant: T-Mobile USA, Inc., Bellevue, WA (US)

(72) Inventors: Parag Garg, Woodinville, WA (US); Derrick Ives, North Bend, WA (US); Michele Lundahl, Yarrow Point, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/195,316

(22) Filed: May 9, 2023

(65) Prior Publication Data

US 2023/0276206 A1 Aug. 31, 2023

Related U.S. Application Data

(63) Continuation of application No. 17/718,731, filed on Apr. 12, 2022, now Pat. No. 11,659,363, which is a continuation of application No. 17/162,528, filed on Jan. 29, 2021, now Pat. No. 11,330,406.

(51) Int. Cl.
*H04W 4/16* (2009.01)
*H04M 3/42* (2006.01)

(52) U.S. Cl.
CPC ......... *H04W 4/16* (2013.01); *H04M 3/42042* (2013.01)

(58) Field of Classification Search
CPC ............... H04W 4/16; H04M 3/42042

USPC ........................................................ 455/415
See application file for complete search history.

(56) References Cited

U.S. PATENT DOCUMENTS

| 5,970,404 A | 10/1999 | Foti |
| 6,064,725 A | 5/2000 | Nakanishi |
| 6,226,367 B1 | 5/2001 | Smith et al. |
| 6,233,325 B1 | 5/2001 | Frech et al. |

(Continued)

FOREIGN PATENT DOCUMENTS

KR 1020150019411 A 2/2015

OTHER PUBLICATIONS

International Patent Application No. PCT/US2022/013695, International Search Report and Written Opinion mailed May 10, 2022, 10 pages.

(Continued)

*Primary Examiner* — Binh Kien Tieu

(57) ABSTRACT

Methods, systems, and apparatus, including computer programs encoded on a computer storage medium, for implementing a caller identifier are disclosed. In one aspect, a method includes the actions of receiving, by a server, a request to initiate a telephone call between a calling phone and a callee phone, wherein the request includes a telephone number of the calling phone. The actions further include determining, by the server, a name that corresponds to the telephone number. The actions further include accessing, by the server, a calling history that indicates previous telephone calls of the phone number. The actions further include, based on the calling history that indicates previous telephone calls of the phone number, determining, by the server, whether to generate a notification that includes the name that corresponds to the telephone number.

18 Claims, 5 Drawing Sheets

(56) References Cited

U.S. PATENT DOCUMENTS

| | | |
|---|---|---|
| 6,947,533 B2 | 9/2005 | Okamura et al. |
| 7,190,777 B2 | 3/2007 | Urban et al. |
| 7,200,211 B1 | 4/2007 | Lemke |
| 7,796,998 B1 | 9/2010 | Zellner et al. |
| 8,238,532 B1 | 8/2012 | Cox et al. |
| 8,270,588 B2 | 9/2012 | Schwartz |
| 8,457,613 B2 | 6/2013 | Schmackpfeffer et al. |
| 8,577,002 B2 | 11/2013 | Stein et al. |
| 8,644,471 B1 * | 2/2014 | Peden .................. H04M 3/436 379/142.04 |
| 8,861,694 B1 | 10/2014 | Kirchhoff et al. |
| 9,014,359 B1 * | 4/2015 | Pfeffer ................ H04M 3/4365 379/88.19 |
| 9,654,629 B1 | 5/2017 | Brackett et al. |
| 9,811,399 B1 * | 11/2017 | Bradley ................ G06F 16/951 |
| 9,860,371 B2 * | 1/2018 | Collart .............. H04M 3/42042 |
| 10,205,825 B2 * | 2/2019 | Dowlatkhah ........ H04B 7/0619 |
| 10,440,579 B1 | 10/2019 | Korrapati et al. |
| 10,516,678 B2 | 12/2019 | Liu et al. |
| 10,681,206 B1 * | 6/2020 | Kreiner ............... H04M 7/0078 |
| 10,887,457 B1 | 1/2021 | Degeorgis et al. |
| 11,330,406 B1 * | 5/2022 | Garg ................. H04M 3/42042 |
| 11,659,363 B2 * | 5/2023 | Garg ................. H04M 3/42042 455/415 |
| 2004/0103158 A1 | 5/2004 | Vella et al. |
| 2007/0047519 A1 | 3/2007 | Bangor et al. |
| 2008/0112551 A1 | 5/2008 | Forbes et al. |
| 2010/0086111 A1 | 4/2010 | Gruchala et al. |
| 2011/0085650 A1 | 4/2011 | Cheon et al. |
| 2011/0096772 A1 | 4/2011 | Fronczak et al. |
| 2011/0151850 A1 | 6/2011 | Haaparanta et al. |
| 2012/0213082 A1 | 8/2012 | Carney et al. |
| 2013/0243174 A1 | 9/2013 | Denny et al. |
| 2014/0206326 A1 | 7/2014 | Hodges et al. |
| 2014/0286483 A1 | 9/2014 | Gruchala et al. |
| 2015/0288817 A1 | 10/2015 | Liu |
| 2015/0326712 A1 | 11/2015 | Montpetit et al. |
| 2017/0111364 A1 | 4/2017 | Rawat |
| 2017/0289326 A1 | 10/2017 | Wang et al. |
| 2019/0141184 A1 | 5/2019 | Douglas et al. |
| 2020/0081929 A1 | 3/2020 | Abuelsaad et al. |
| 2020/0322474 A1 | 10/2020 | Kotab |
| 2021/0368043 A1 | 11/2021 | Villarreal et al. |
| 2022/0124195 A1 | 4/2022 | Lu et al. |

OTHER PUBLICATIONS

U.S. Appl. No. 17/162,528, Notice of Allowance mailed Jan. 18, 2022, 46 pages.

U.S. Appl. No. 17/718,731, Notice of Allowance mailed Jan. 18, 2023, 71 pages.

* cited by examiner

CALLER IDENTIFIER

CROSS-REFERENCE TO RELATED APPLICATIONS

This application is a continuation of U.S. application Ser. No. 17/718,731, filed Apr. 12, 2022, which is a continuation of U.S. application Ser. No. 17/162,528, filed Jan. 29, 2021, which are both incorporated by reference.

BACKGROUND

Caller identification is a telephone service that transmits a caller's telephone number to the called party's telephone equipment when the call is being set up. The caller identification service may include the transmission of a name associated with the calling telephone number. The information received from the service may be displayed on a screen of the called party's telephone equipment or a separate screen.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

When a phone is ringing, displaying a caller identification name on that phone can involve accessing and receiving data from many different databases and entities. The caller's telephone service provider may maintain a database that includes phone numbers and associated names for the provider's customers. The called party's telephone service provider may maintain its own database for its customers. Also, third parties manage databases that telephone service providers may subscribe to and use to assign a caller identification name to a number.

In some instances, a service provider may allow a customer to change the name that is associated with the customer's number. In many instances, this improves the accuracy of the database. In a few instances, this may allow some customers to change the name to a false name. It would be beneficial to be able to verify entries in the caller identification database and provide an indication of that verification to a called party.

To identify a possible incorrect name in a caller identification of a call when the call is being placed, a service provider may access data related to that phone number. That data may include the previous location and time that the number appeared in the caller identification of a placed call, the previous location and time that a device associated with the number received a call, the date and time of the last change to the caller identification of the number, a type of customer that corresponds to the name in the caller identification, and/or any other similar information. The service provider may provide that data to a model that is configured to determine a confidence level that the caller identification is correct. The service provider may block the call if the confidence level is below a threshold. If the confidence level is above a threshold, then the service provider may complete the call. If the confidence level is between those two thresholds, then the service provider may complete the call but include a warning that can signal to the called party that the caller identification may be incorrect.

Figure 1:
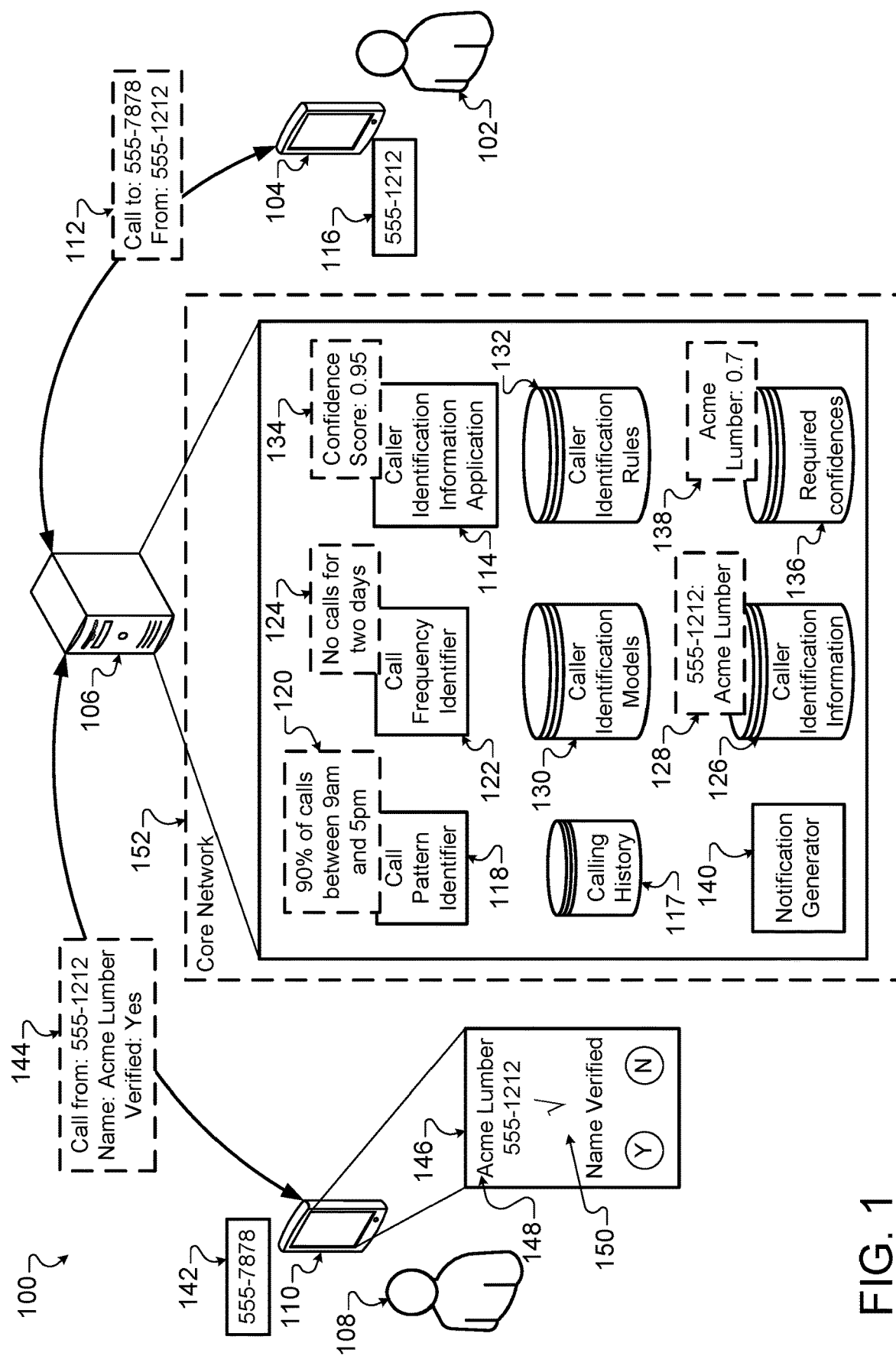
FIG. 1 illustrates an example system that is configured to determine whether to include caller identification information in an incoming telephone call notification.

FIG. 1 illustrates an example system 100 that is configured to determine whether to include caller identification information in an incoming telephone call notification. Briefly, and as described in more detail below, the system 100 is configured to receive telephone call requests from computing devices. In response to a telephone call request, the system 100 generates and transmits, to a callee phone, a notification of the incoming telephone call. The system 100 determines whether to include caller identification information for the caller in the notification based on various factors. In some instances, the system 100 may determine not to complete the telephone call by bypassing transmitting a notification of the incoming telephone call.

In more detail, the user 102 is interacting with the computing device 104. The computing device 104 may be any type of device that is configured to place a telephone call. For example, the computing device 104 may be a mobile phone, tablet, smart watch, wearable device, laptop computer, desktop computer, and/or any other similar device. The phone number 116 of the computing device 104 may be 555-1212. The computing device 104 may include a telephone application with which the user 102 interacts to place a telephone call. For example, the user 102 may interact with the telephone application to call the telephone number 555-7878.

The telephone application of the computing device 104 may transmit a telephone call request 112 to the server 106. The server 106 may be included in or in communication with a network such as a wireless carrier network that provides voice and data communication services to multiple devices, such as the computing devices 104 and 110 and other devices. The wireless carrier network may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), 5th Generation (5G) wireless systems, CDMA-2000 (Code Division Multiple Access 2000), and/or other similar standards. In some implementations, the server 106 may communicate with the computing devices 104 and 110 and other devices using a Wi-Fi network, short range radio, infrared communication, and/or any other similar communication technique.

The wireless carrier network may include a radio access network and a core network 152. The radio access network may include multiple base stations. The multiple base stations are responsible for handling voice and/or data traffic between multiple devices, such as the computing devices 104 and 110 and other devices and the core network 152. Accordingly, each of the base stations may provide a corresponding network cell that delivers telecommunication and data communication coverage. The core network 152 may use the network cells to provide communication services to the multiple subscriber devices. For example, the core network 152 may connect the multiple devices to other telecommunication and data communication networks, such as the Internet and the public switched telephone network (PSTN). The base stations are responsible handling voice and data traffic between devices and the core network 152. In some implementations, the base stations may be in the form of eNodeB nodes. Each eNodeB node may include a base transceiver system (BTS) that communicates via an antenna system over an air-link with one or more devices that are within range. The antenna system of an eNodeB node may include multiple antennas that are mounted on a radio tower to provide a coverage area that is referred to as a "cell." The BTS may send RF signals to devices and receive radio signals from devices.

Before the server 106 generates and transmits a telephone call notification 144, the server 106 may attempt to determine a name to include in the telephone call notification 144. The server 106 may include a caller identification information application 114 that is configured to determine whether to include name information in the telephone call notification 144. The caller identification information application 114 may also be configured to determine whether to include any type of confidence information in the caller identification information application 114. The confidence information may indicate to the user 108 how likely the telephone call notification 144 includes the name of the user 102 or an entity that the user 102 represents.

The caller identification information application 114 may receive the telephone call request 112 and determine the phone number of the callee phone and the caller phone. For example, the phone number of the callee phone in the telephone call request 112 may be 555-7878 and the phone number of the caller phone may be 555-1212. The caller identification information application 114 may access the caller identification information 126. The caller identification information 126 may include name and phone number pairs for the phone numbers of the wireless carrier network. In some implementations, the caller identification information 126 may be stored on another device that the server 106 accesses. In some implementations, the server 106 may periodically provide the caller identification information 116 to a third-party computing device so that the third-party computing device can update other caller information data with the data included in the caller identification information 116. In some cases, the server 106 may access the caller information data of the third-party computing device if the server 106 receives an incoming phone call in order to identify a name to display on a recipient's phone. In some implementations, the server 106 may access the caller information data of the third-party computing device to update the caller identification information 126.

In the example of FIG. 1, the caller identification information application 114 may access the caller name entry 128 of the caller identification information 126 and determine that the name that corresponds to the number 555-1212 is Acme Lumber. Because the caller identification information 126 may include errors and the possible fraudulent entries, the caller identification information application 114 may access additional information to determine whether Acme Lumber is likely an accurate representation of the user 102.

The caller identification information application 114 may access the calling history 120. The calling history 117 may store data indicating the previous incoming and outgoing calls of phone numbers of the wireless carrier network. The calling history 117 may include calling data for placed telephone calls that includes the phone number called, the duration of the telephone call, whether the called party answered the telephone call, whether the telephone call went to voicemail, the time and date of the telephone call, and/or any other similar information. The calling history 117 may include calling data for received telephone calls that includes the phone number of the calling party, the duration of the telephone call, whether the called party answered the telephone call, whether the telephone call went to voicemail, the time and date of the telephone call, and/or any other similar information.

The server 106 may include a call pattern identifier 118. The call pattern identifier may be implemented by one or more processors of the server 106. The call pattern identifier may be configured to analyze the calling history 117 and identify any calling patterns. The calling patterns may include the time periods when a phone associated with a phone number typically places calls, the time periods when a phone associated with a phone number typically receives calls, a mean and median length of the telephone calls, whether the telephone calls are between a varying group of phone numbers or a limited group of phone numbers, and/or any other similar calling pattern. The call pattern identifier 118 may apply thresholds to determine these calling patterns. For example, the call pattern identifier 118 may determine the time periods when a phone associated with a phone number receives and/or places ninety percent of the phone calls. The call pattern identifier 118 may determine a percentage of telephone calls for the most common five numbers.

As illustrated in FIG. 1, the call pattern identifier 118 may analyze the calling history 117 for the phone number 555-1212. The call pattern identifier 118 may determine the pattern 120 for the phone number 555-1212. The pattern 120 may indicate that the phone number receives ninety percent of its telephone calls between the hours of 9 am and 5 pm on Monday through Friday. The call pattern identifier 118 may also determine that the most common five telephone numbers that call or are called by 555-1212 account for five percent of the total telephone calls.

The server 106 may include a call frequency identifier 122. The call frequency identifier 122 may be implemented by one or more processors of the server 106. The call frequency identifier 122 may be configured to determine the frequency that a phone associated with a phone number places and/or received telephone calls. The call frequency identifier 122 may determine an average frequency that a phone associated with a phone number places and/or received telephone calls on average, the last time that a phone associated with a phone number places and/or received a telephone call, the average frequency during a specific time period, and/or any other similar frequency.

As illustrated in FIG. 1, the call frequency identifier 122 may analyze the calling history 117 for the phone number 555-1212. The call frequency identifier 122 may determine the frequency 124 for the phone number 555-1212. The frequency 124 may indicate that the phone number 555-1212 has not received and/or placed a telephone call in two days. The call frequency identifier 122 may also determine an average frequency of telephone calls during the time period identified by the call pattern identifier 118. The call frequency identifier 122 may determine that the phone number 555-1212 receives and/or places a telephone call every five minutes on average between 9 am and 5 pm.

The caller identification information application 114 analyzes the name of the caller name entry 128, the phone number 116, the frequency 124, the pattern, and/or any other similar information using the caller identification models 130 and/or the caller identification rules 132. The caller identification information application 114 may determine whether the name of the caller name entry 128 likely matches the phone number 116. For example, the caller identification information application 114 may determine that the name of the caller name entry 128 likely matches the phone number 116 or that the name of the caller name entry 128 does not likely match the phone number 116. In some implementations, the caller identification information application 114 may determine a confidence score 134 that indicates a likelihood that the name of the caller name entry 128 likely matches the phone number 116.

The caller identification rules 132 may specify how to compare the name of the caller name entry 128, the phone number 116, the frequency 124, the pattern, and/or any other similar information. For example, a caller identification rule may specify to compare the average number of calls during a week to the number of calls during the previous week. If the number of calls during the previous week is a threshold percentage lower than the average number of calls during a week, then the caller identification rule may specify that the name of the caller name entry 128 may likely be incorrect. If the number of calls during the previous week is at least within a threshold percentage of the average number of calls during a week, then the caller identification rule may specify that the name of the caller name entry 128 is likely correct.

As another example, a caller identification rule may specify to compare the number of days without a telephone call to a threshold number of days. If the number of days without a telephone call is greater than the threshold number of days, then the caller identification rule may specify that the name of the caller name entry 128 may likely be incorrect. If the number of days without a telephone call is less than the threshold number of days, then the caller identification rule may specify that the name of the caller name entry 128 is likely correct.

In some implementations, the caller identification information application 114 may generate a confidence score 134 using the caller identification rules 132. For example, a caller identification rule may specify to compare the average number of calls during a week to the number of calls during the previous week. Based on the percent difference that the number of calls during the previous week differs than the average number of calls during a week, the caller identification information application 114 may determine a confidence score 134. If the percent difference is between zero and ten percent, then the confidence score may be 0.9. If the percent difference is between ten and twenty percent, then the confidence score may be 0.8.

The caller identification models 130 may be configured to receive the name of the caller name entry 128, the phone number 116, the frequency 124, the pattern 120, and/or any other similar information and output data indicating whether the name of the caller name entry 128 is likely correct. In some implementations, the caller identification models 130 may output a confidence score 134 indicating a likelihood that the name of the caller name entry 128 is correct. The caller identification models 130 may include various models that are each configured to receive different input. For example, a first caller identification model may be configured to receive data indicating an average number of phone calls during a week, the number of calls during the previous week, the time period since the last call, the name of the caller name entry 128, and the phone number 116. As another example, a second caller identification model may be configured to receive data indicating the name of the caller name entry 128, the phone number 116, and the time period since the last call. The caller identification information application 114 may be configured to select a model from the caller identification models 130 depending on the data that the caller identification information application 114 is analyzing.

In some implementations, the caller identification information application 114 may use both the caller identification models 130 and the caller identification rules 132 to analyze the caller name entry 128, the phone number 116, the frequency 124, the pattern 120, and/or any other similar information. The caller identification information application 114 may analyze the data using various caller identification rules 132 and may determine a confidence score from each rule. The caller identification information application 114 may determine the average confidence score of the confidence scores from the various caller identification rules 130, may select the highest confidence score, select the lowest confidence score, and/or a similar combination. The caller identification information application 114 may analyze the data using a selected caller identification model 130 and determine a confidence score. The caller identification information application 114 may combine the confidence score from the caller identification rules 132 with the confidence score from the selected caller identification model 130 to determine a confidence score for the candidate name for the current telephone call. In some instances, the caller identification information application 114 may average the confidence score from the caller identification rules 132 with the confidence score from the selected caller identification model 130, take the lower confidence score, take the higher confidence score, and/or a similar combination.

The caller identification information application 114 may access the required confidences 136 that includes various confidence thresholds for various names. Different names may correspond to different thresholds based on a risk of harm that the callee may experience if the caller identification name presented to the callee is incorrect. For example, some government entities such as the Internal Revenue Service may have a high confidence threshold, such as 0.9. Personal users may have a low confidence threshold, such as 0.6. In some implementations, different types of names and entities may correspond to different confidence thresholds. For example, names of commercial businesses may have a confidence threshold of 0.8.

If the caller identification information application 114 determines that the confidence score 134 satisfies the confidence threshold 138, then the caller identification information application 114 may instruct the notification generator 140 to generate a notification indicating the incoming call that includes the name from the caller name entry 128. If the caller identification information application 114 determines that the confidence score 134 does not satisfy the confidence threshold 138, then the caller identification information application 114 may instruct the notification generator 140 to generate a notification indicating the incoming call that does not include the name from the caller name entry 128. In this case, the notification generator 140 may generate a notification 144 that includes the phone number 116 without the name from the caller name entry 128.

In some implementations, the required confidences 136 may include various confidence ranges. Each confidence range may correspond to a different action regarding the telephone call and the notification 144. The caller identification information application 114 may instruct the notification generator 140 to generate the notification 144 based on the action that corresponds to the confidence range within which the confidence score 134 falls. Some actions may include not completing the telephone call, including the telephone number 116 without the name from the caller name entry 128, including the telephone number 116 with the name from the caller name entry 128 and a verified icon, including the telephone number 116 with the name from the caller name entry 128 and a caution icon, and/or any other similar action. The verified icon may indicate the highest confidence level, the caution icon may indicate that the name may not be correct.

In the example of FIG. 1, the caller identification information application 114 uses the caller identification models 130 and the caller identification rules 132 to determine that the confidence score 134 that the name from the caller name entry 128, "Acme Lumber," is 0.95. That confidence score indicates that the caller identification information application 114 may be ninety-five percent confident that the "Acme Lumber" is the proper name for the phone number 116, 555-1212. The caller identification information application 114 may access the required confidences 136 and determine that the required confidence 138 for "Acme Lumber" is 0.7. "Acme Lumber" may also include a confidence range that indicates that if the confidence score is above 0.9, then the verified icon may be presented to the user 108 when the computing device 110 is ringing.

The caller identification information application 114 determines the action for the telephone call based on comparing the confidence score 134 to the confidence threshold 138 and/or the confidence ranges. The caller identification information application 114 instructs the notification generator 140 to generate a notification 144 to provide to the computing device 110. The notification 144 may include the phone number 116, the name from the caller name entry 128, an instruction to present an icon, such as a verified icon or a caution icon, and/or any other similar data. The notification generator 140 may generate the notification 144 that is a session initiation protocol invite. The notification generator 140 may include the name from the caller name entry 128 and/or an instruction to present an icon in the session initiation protocol invite, along with the phone number 116.

The server 106 provides, to the computing device, the notification 144 indicating that there is an incoming telephone call. The computing device 110 receives the notification 144 and generates the graphical interface 146 based on the notification 144. The graphical interface 146 may include the name 148 from the caller name entry 128, the phone number 116 of the computing device 104, the verified icon 150, and/or any other similar information or graphics. If the notification 144 did not include the name, then the graphical interface 146 may include the phone number 116 without a name. If the notification 144 included the name and no instruction to present a verified, caution, or other type of icon, then the graphical interface 146 may include the phone number 116 and the name 148 without the verified icon 150. The user 108 may answer the telephone call on the computing device 110 and begin talking with the user 102.

In some implementations, the caller identification information application 114 may be configured to the caller identification information 126 to third-party identification information. The caller identification information application 114 may identify inconsistencies between the caller identification information 126 and the third-party identification information. In some cases, the caller identification information application 114 may not be able to determine whether the information in the caller identification information 126 or the third-party identification information. If the inconsistent name and phone number pair has a confidence score that is greater than a threshold in the caller identification information 126 or if the inconsistent name and phone number pair has a verified label in the caller identification information 126, then the caller identification information application 114 may determine that the third-party identification information is incorrect. The caller identification information application 114 may provide a notification to an entity or device that stores or manages the third-party identification information identifying the likely incorrect name and phone number pair and provide the correct name for that phone number.

In some implementations, the caller identification information application 114 may detect fraudulent changes in the caller identification information 126 or third-party identification information. If the frequency of the fraudulent changes is greater than a threshold frequency, then the caller identification information application 114 may attempt to analyze the caller identification information 126 or third-party identification information at a greater frequency in an attempt to quickly correct the fraudulent changes. The caller identification information application 114 may detect likely fraudulent changes by comparing the caller identification information 126 to the third-party identification information. If either includes a recently changed to a verified entry, then that entry may be fraudulent. In some instances, the caller identification information application 114 may receive data indicating that a name phone number pair includes a fraudulent name. A user may provide an indication of the fraudulent entry after receiving a phone call from that phone number and the caller did not correspond to the name or information presented on the phone.

Figure 2:
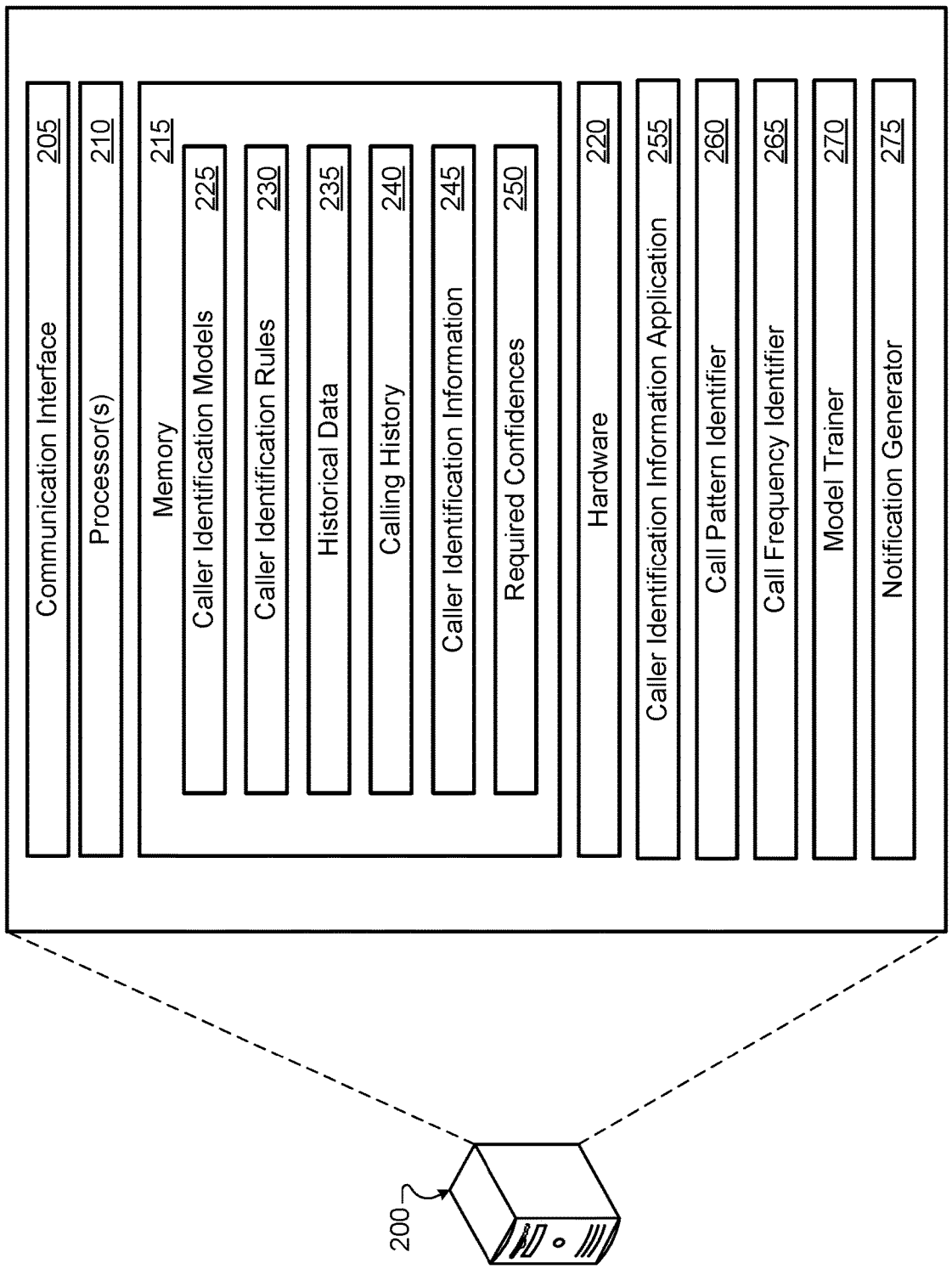
FIG. 2 illustrates an example server that is configured to determine whether to include caller identification information in an incoming telephone call notification.

FIG. 2 illustrates an example server 200 that is configured to determine whether to include caller identification information in an incoming telephone call notification. The server 200 may be any type of computing device that is configured to communicate with other computing devices. The server 200 may be integrated into a wireless carrier network or interact with a wireless carrier network. The server 200 may communicate with other computing devices using a wide area network, a local area network, the internet, a wired connection, a wireless connection, and/or any other type of network or connection. The wireless connections may include Wi-Fi, short-range radio, infrared, and/or any other wireless connection. The server 200 may be similar to the server 106 of FIG. 1. Some of the components of the server 200 may be implemented in a single computing device or distributed over multiple computing devices. Some of the components may be in the form of virtual machines or software containers that are hosted in a cloud in communication with disaggregated storage devices.

The server 200 may include a communication interface 205, one or more processors 210, memory 215, and hardware 220. The communication interface 205 may include communication components that enable the server 200 to transmit data and receive data from devices connected to the wireless carrier network. The communication interface 205 may include an interface that is configured to communicate with base stations of a wireless carrier network. The communication interface 205 may receive data that other devices transmit to the base stations and/or transmit data to the base stations for transmission to the other devices. In some implementations, the communication interface 205 may be configured to communicate using over a wide area network, a local area network, the internet, a wired connection, a wireless connection, and/or any other type of network or connection. The wireless connections may include Wi-Fi, short-range radio, infrared, and/or any other wireless connection.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement a caller identification information application 255. The caller identification information application 255 may be similar to the caller identification information application 114 of FIG. 1. The caller identification information application 255 may be configured to determine whether to include name information in the telephone call notification 255. The caller identification information application 255 may also be configured to determine whether to include any type of confidence information in the caller identification information application 114. The confidence information may indicate to the callee how likely the name presented on a display of the callee devices accurately represents the caller. In some implementations, the caller identification information application 255 may determine whether to transmit a notification to the callee device indicating the incoming telephone call.

The caller identification information application 255 may receive a telephone call request when a calling device places a telephone call. The telephone call request may include the phone number of the calling device and the callee device. The caller identification information application 255 may determine a name that corresponds to that phone number. For example, the phone number of the callee device may be 555-7878 and the phone number of the caller device may be 555-1212. The caller identification information application 255 may access the caller identification information 245. The caller identification information 245 may include name and phone number pairs for the phone numbers of the wireless carrier network. In some implementations, the caller identification information 245 may be stored on another device that the server 200 accesses. In some implementations, the server 200 may periodically provide the caller identification information 245 to a third-party computing device so that the third-party computing device can update other caller identification information data with the data included in the caller identification information 245. In some cases, the server 200 may access the caller identification information data of the third-party computing device if the server 200 receives an incoming phone call in order to identify a name to display on a recipient's phone. In some implementations, the server 200 may access the caller identification information data of the third-party computing device to update the caller identification information 245.

The caller identification information application 255 may access the calling history 240. The calling history 240 may store data indicating the previous incoming and outgoing calls of phone numbers of the wireless carrier network. The calling history 240 may include calling data for placed telephone calls that includes the phone number called, the duration of the telephone call, whether the called party answered the telephone call, whether the telephone call went to voicemail, the time and date of the telephone call, and/or any other similar information. The calling history 240 may include calling data for received telephone calls that includes the phone number of the calling party, the duration of the telephone call, whether the called party answered the telephone call, whether the telephone call went to voicemail, the time and date of the telephone call, and/or any other similar information.

The one or more processors 210 may implement a call pattern identifier 260. The call pattern identifier 260 may be similar to the call pattern identifier 118 of FIG. 1. The call pattern identifier 260 may be configured to analyze the calling history 240 and identify any calling patterns. The calling patterns may include the time periods when a phone associated with a phone number typically places calls, the time periods when a phone associated with a phone number typically receives calls, a mean and median length of the telephone calls, whether the telephone calls are between a varying group of phone numbers or a limited group of phone numbers, and/or any other similar calling pattern. The call pattern identifier 260 may apply thresholds to determine these calling patterns. For example, the call pattern identifier 260 may determine the time periods when a phone associated with a phone number receives and/or places ninety percent of the phone calls. The call pattern identifier 260 determine a percentage of telephone calls for the most common five numbers.

The one or more processors 210 may implement a call frequency identifier 265. The call frequency identifier 265 may be similar to the call frequency identifier 122 of FIG. 1. The call frequency identifier 265 may be configured to determine the frequency that a phone associated with a phone number places and/or received telephone calls. The call frequency identifier may analyze the calling history 240. The call frequency identifier 265 may determine an average frequency that a phone associated with a phone number places and/or received telephone calls on average, the last time that a phone associated with a phone number places and/or received a telephone call, the average frequency during a specific time period, and/or any other similar frequency.

The caller identification information application 255 analyzes data from the call pattern identifier 260 and the call frequency identifier 265, the phone number of the caller device, the name of the caller name entry, and/or any other similar information using the caller identification models 225 and/or the caller identification rules 230. The caller identification information application 255 may determine whether the name of the caller name entry likely matches the phone number of the calling device. For example, the caller identification information application 255 may determine that the name of the caller name entry likely matches the phone number of the calling device or that the name of the caller name entry does not likely match the phone number of the calling device. In some implementations, the caller identification information application 255 may determine a confidence score that indicates a likelihood that the name of the caller name entry likely matches the phone number of the calling device.

The caller identification rules 230 may specify how to compare the name of the caller name entry, the phone number of the calling device, data from the call pattern identifier 260 and the call frequency identifier 265, and/or any other similar information. For example, a caller identification rule may specify to compare the average number of calls during a week to the number of calls during the previous week. If the number of calls during the previous week is a threshold percentage lower than the average number of calls during a week, then the caller identification rule may specify that the name of the caller name entry may likely be incorrect. If the number of calls during the previous week is at least within a threshold percentage of the average number of calls during a week, then the caller identification rule may specify that the name of the caller name entry is likely correct.

As another example, a caller identification rule may specify to compare the number of days without a telephone call to a threshold number of days. If the number of days without a telephone call is greater than the threshold number of days, then the caller identification rule may specify that the name of the caller name entry may likely be incorrect. If the number of days without a telephone call is less than the threshold number of days, then the caller identification rule may specify that the name of the caller name entry is likely correct.

In some implementations, the caller identification information application 255 may generate a confidence score using the caller identification rules 230. For example, a caller identification rule may specify to compare the average number of calls during a week to the number of calls during the previous week. Based on the percent difference that the number of calls during the previous week differs than the average number of calls during a week, the caller identification information application 255 may determine a confidence score. If the percent difference is between zero and ten percent, then the confidence score may be 0.9. If the percent difference is between ten and twenty percent, then the confidence score may be 0.8.

The caller identification models 225 may be configured to analyze the name of the caller name entry, the phone number of the calling device, data from the call pattern identifier 260 and the call frequency identifier 265, and/or any other similar information and output data indicating whether the name of the caller name entry is likely correct. In some implementations, the caller identification models 225 may output a confidence score indicating a likelihood that the name of the caller name entry is correct. The caller identification models 225 may include various models that are each configured to receive different input. For example, a first caller identification model may be configured to receive data indicating an average number of phone calls during a week, the number of calls during the previous week, the time period since the last call, the name of the caller name entry, and the phone number of the calling device. As another example, a second caller identification model may be configured to receive data indicating the name of the caller name entry, the phone number of the calling device, and the time period since the last call. The caller identification information application 255 may be configured to select a model from the caller identification models 225 depending on the data that the caller identification information application 255 is analyzing.

In some implementations, the caller identification information application 255 may use both the caller identification models 225 and the caller identification rules 230 to analyze the name of the caller name entry, the phone number of the calling device, data from the call pattern identifier 260 and the call frequency identifier 265, and/or any other similar information. The caller identification information application 255 may analyze the data using various caller identification rules 230 and may determine a confidence score from each rule. The caller identification information application 255 may determine the average confidence score of the confidence scores from the various caller identification rules 230, may select the highest confidence score, select the lowest confidence score, and/or a similar combination. The caller identification information application 255 may analyze the data using a selected caller identification model 230 and determine a confidence score. The caller identification information application 255 may combine the confidence score from the caller identification rules 230 with the confidence score from the selected caller identification model 225 to determine a confidence score for the candidate name for the current telephone call. In some instances, the caller identification information application 255 may average the confidence score from the caller identification rules 230 with the confidence score from the selected caller identification model 225, take the lower confidence score, take the higher confidence score, and/or a similar combination.

The one or more processors 210 may implement a model trainer 270. The model trainer 270 may be configured to train the caller identification models 225 using the historical data 235 and machine learning. The model trainer 270 may train multiple models that are each configured to receive different combinations of inputs. In some instances, the model trainer 270 may train models to generate data indicating whether the name of the caller name entry matches the phone number of the calling device or a confidence score indicating a likelihood that the name of the caller name entry matches the phone number of the calling device.

The historical data 235 may include the data collected and generated by the server 200 and other computing devices that manage other caller identification information at the time that the server 200 and the other computing devices determined whether to comply with the name change request. For example, the historical data 235 may include the name of the caller name entry, the phone number of the calling device, data from the call pattern identifier 260 and the call frequency identifier 265, and/or any other similar information. The historical data 235 may include previous data accessed from the calling history 234, the required confidences 250, and/or any other similar data storage. The historical data 235 may also include a label indicating whether the name was an accurate reflection of the entity or the person associated with the phone number. The server 200 may determine the label based on feedback from users who receive phone calls from various phone numbers and indicate during or after the telephone call whether the name of the caller identification was an accurate reflection of the person or entity who called.

The model trainer 270 may be configured to generate data samples that each include the data that the model trainer 270 or other computing device analyzed when determining whether to comply with the name change request. Each of the data samples may include different types of data depending on what the model trainer 270 or the other computing device received. For example, some data samples may include data from the call frequency identifier 265 and other data samples may not include data from the call frequency identifier 265.

The model trainer 270 may train a model using machine learning and the data samples that each include the same type of data. For example, the model trainer 270 may train a model using data samples that includes data from the call pattern identifier 260 and data from the call frequency identifier 265. These data samples may also include a label indicating whether the name was an accurate reflection of the entity or the person associated with the phone number. The resulting model may be configured to receive data generated by the call pattern identifier 260 and the call frequency identifier 265. The model may be configured to output data indicating whether the name of the caller name entry matches the phone number of the calling device. In some implementations, the data samples may include the telephone number and/or the name of the caller name entry. In this case, the resulting model may be configured to receive the telephone number and/or the name of the caller name entry in addition to data similar to the other data in the data samples.

The caller identification information application 255 may be configured to compare the confidence score to the required confidences 250. The required confidences 250 may include various confidence thresholds for various names. The caller identification information application 255 may select the confidence threshold that corresponds to the name in the name caller name entry. If the caller identification information application 255 determines that the confidence score satisfies the confidence threshold, then the caller identification information application 255 may instruct the notification generator 275 to generate a notification indicating the incoming call that includes the name from the caller name entry. If the caller identification information application 255 determines that the confidence score does not satisfy the confidence threshold, then the caller identification information application 255 may instruct the notification generator 275 to generate a notification indicating the incoming call that does not include the name from the caller name entry. In this case, the notification generator 275 may generate a notification that includes the phone number without the name from the caller name entry.

The required confidences 250 may include various confidence thresholds that correspond to various names. Different names may correspond to different thresholds based on a risk of harm that the callee may experience if the caller identification name presented to the callee is incorrect. For example, some government entities such as the Internal Revenue Service may have a high confidence threshold, such as 0.9. Personal users may have a low confidence threshold, such as 0.6. In some implementations, different types of names and entities may correspond to different confidence thresholds. For example, names of commercial businesses may have a confidence threshold of 0.8.

The one or more processors 210 may implement the notification generator 275. The notification generator 275 may be similar to the notification generator 140 of FIG. 1. The notification generator 275 may be configured to generate a notification to provide to the callee device. The notification may include the phone number of the calling device, a name that corresponds to the phone number, and/or some indication of the confidence score, such as an icon that visually indicates the confidence that the name corresponds to the phone number.

The caller identification information application 255 determines the action for the telephone call based on comparing the confidence score to the confidence threshold. The caller identification information application 255 instructs the notification generator 275 to generate a notification to provide to the computing device. The notification may include the phone number of the calling device, the name from the caller name entry, an instruction to present an icon, such as a verified icon or a caution icon, and/or any other similar data. The notification generator 275 may generate a notification that is a session initiation protocol invite. The notification generator 275 may include the name from the caller name entry and/or an instruction to present an icon in the session initiation protocol invite, along with the phone number of the calling device.

The notification generator 275 may provide the notification to the communication interface 205. The communication interface 205 may transmit the notification to the callee device. The callee device may generate a graphical interface to present on the callee device that includes the information included in the notification. The graphical interface may include the phone number of the calling device, the name from the caller name entry, an instruction to present an icon, such as a verified icon or a caution icon, and/or any other similar data depending on the data included in the notification.

Figure 3:
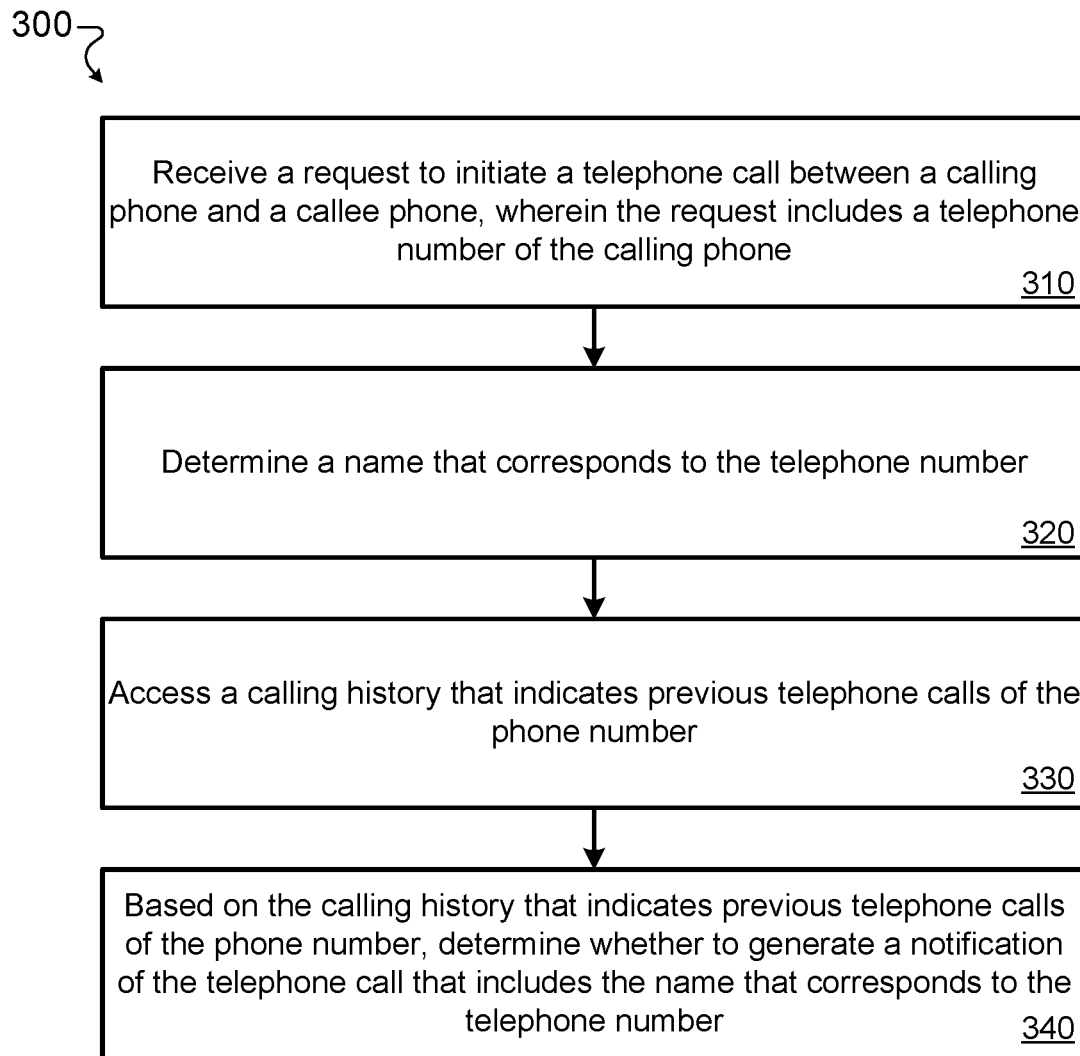
FIG. 3 is a flowchart of an example process for determining whether to include caller identification information in an incoming telephone call notification.

FIG. 3 is a flowchart of an example process 300 for determining whether to include caller identification information in an incoming telephone call notification. In general, the process 300 receives a request to initiate a telephone call. The process 300 determines a name that corresponds to the phone number of the calling phone. Based on the calling history of the phone number of the calling phone, the process 300 determines whether to include that name in a notification provided to the callee phone. The process 300 will be described as being performed by the server 106 of FIG. 1 and will include references to other components in FIG. 1. In some implementations, the process 300 may be performed by the server 200 of FIG. 2.

The server 106 receives a request to initiate a telephone call between a calling phone 104 and a callee phone 110. The request includes a telephone number of the calling phone 110 (310). The calling phone 104 may include a telephone application with which the user 102 is able to interact to initiate a telephone call. The user 102 may dial the number of the callee phone 110, and the server 106 may receive the request to initiate the telephone call from the telephone application on the calling phone 104. The request may include the phone number of the callee phone 110 and the phone number of the calling phone 104.

The server 106 determines a name that corresponds to the telephone number (320). The server 106 may access caller identification information that includes multiple telephone number and name pairs. The server 106 may access the pair that includes the telephone number of the calling device to determine the corresponding name. The server 106 may store the caller identification information, or the server 106 may access the caller identification information from another device.

The server 106 accesses a calling history 117 that indicates previous telephone calls of the phone number (330). The calling history 117 may store data indicating the previous incoming and outgoing calls of phone numbers of the wireless carrier network. The calling history 117 may include calling data for placed telephone calls that includes the phone number called, the duration of the telephone call, whether the called party answered the telephone call, whether the telephone call went to voicemail, the time and date of the telephone call, and/or any other similar information. The calling history 117 may include calling data for received telephone calls that includes the phone number of the calling party, the duration of the telephone call, whether the called party answered the telephone call, whether the telephone call went to voicemail, the time and date of the telephone call, and/or any other similar information.

In some implementations, the server 106 may determine time periods that devices that correspond to the phone number have previously placed calls. The server 106 may determine the time periods during a week when the devices that correspond to the phone number placed at least ninety percent of the telephone calls. The server 106 may determine an average number of calls for various days of the week. The server 106 may determine the telephone calls for the previous time periods, such as the number of placed and/or received calls during the previous week.

In some implementations, the server 106 may determine the amount of time that has elapsed since the caller device 104 or another device of the phone number 116 placed or received a telephone call. For example, the server 106 may determine that the caller device 104 or another device of the phone number 116 has not placed or received a telephone call in the past fifty hours.

In some implementations, the server 106 may determine a location of the caller device 104. The server 106 may determine the location of the caller device 104 by identifying the base station with which the caller device 104 is communicating. In some instances, the server 106 may request location data from the caller device 104. The caller device 104 may provide the location data in response to the request or without first receiving the request.

In some implementations, the server 106 determines a classification of the telephone number 116. The classification may be preassigned to the telephone number 116 and other telephone numbers. The classification may relate to the type of customer who may be assigned the number. For example, the group of phone number that include 555-1XXX may be assigned to retail business. If the telephone number 116 is 555-1212, then the classification may be retail business. Other groups of phone number may have different classifications and may be assigned to other customers.

Based on the calling history that indicates previous telephone calls of the phone number 116, the server 106 determines whether to generate a notification of the telephone call that includes the name that corresponds to the telephone number 116 (340). In some implementations, the server 106 determines to generate a notification that includes the name that corresponds to the telephone number 116. In this case, the server 106 generates the notification that includes the name that corresponds to the telephone number 116. The server 106 transmits the notification to the callee device. In some implementations, the server 106 determines to generate a notification that includes telephone number 116 and that does not include the name. In this case, the server 106 generates the notification to include the telephone number 116 without the name. The server 106 transmits the notification to the callee device.

In some implementations, the server 106 may determine whether to generate a notification of the telephone call that includes the name that corresponds to the telephone number 116 based further on the time periods that devices that correspond to the phone number have previously placed and/or received telephone calls. The server 106 may determine whether to generate a notification of the telephone call that includes the name that corresponds to the telephone number 116 based further on the amount of time that has elapsed since a device that corresponds to the phone number has previously placed and/or received a telephone call. In some implementations, the server 106 may determine whether to generate a notification of the telephone call that includes the name that corresponds to the telephone number 116 based further on the location of the computing device.

In some implementations, the server 106 may provide the calling history that indicates previous telephone calls of the phone number, the telephone number 116, and the name as an input to a model. The model may be configured to determine whether the name accurately reflects the telephone number. Based on the output of the model, the server 106 determines whether to include the name that corresponds to the telephone number 116 in the notification.

In some implementations, the server 106 may determine a confidence value that reflects the likelihood that the name corresponds to the phone number 116. The server 106 may access a confidence threshold for the name. If the confidence value satisfies the confidence threshold, then the server may determine to include the name that corresponds to the telephone number 116 in the notification.

In some implementations, the server 106 may determine whether to include an indication of the confidence value in the notification. In some instances, the server 106 may determine to include an indication that the server 106 has a high confidence that the name matches the phone number 116 if the confidence value is greater than a threshold, such as 0.9. In some instances, the server 106 may determine to include the indication that the server 106 has a medium confidence that the name matches the phone number 116 if the confidence value is between 0.7 and 0.9.

In some implementation, the server 106 may have previously received data from an owner of the phone number 116 that indicates the name. That data may include an identification document or other information that indicates the name corresponds to the phone number 116. In this case, the server 106 may store data in the caller identification data indicating that the name is verified for that phone number 116. In this case, the server 106 may generate a notification indicating that the name is verified for that phone number 116. The user of the callee device may see an indication of the verified name for the phone number 116 and have confidence that the name is accurate.

The server 106 may store data indicating that several name and phone number pairs are verified based on the server 106 analyzing various documents and/or based on an input from a user or other computing device. Periodically, the server 106 may compare the caller identification information 126 to caller identification information of other devices. The server 106 may determine that some of the verified entries in the caller identification information 126 do not match the caller identification information of another device. In this case, the server 106 may transmit a recommendation to the other device to ensure that the caller identification information is accurate, possibly by checking its accuracy more often. The server 106 may also provide data that includes the names of the verified name and phone number pairs.

In some implementations, the server 106 may determine a location of the calling device 104. The server 106 may determine a location of a device that corresponds to the telephone number 116. If the two locations match, then the server 106 determine whether the name corresponds to the telephone number 116 using the techniques described above. If the two locations do not match because the two locations are greater than at threshold distance apart, then the server 106 may determine that the name does not match the telephone number 116. The server 106 may determine to block the telephone call without notifying the callee device. The server 106 may determine to transmit a notification of the telephone call to the callee device and include, in the notification, data indicating that the telephone call may be a spoof and/or fraudulent call.

In some implementations, the server 106 may determine a wireless carrier that provides wireless service to the calling device 104. The server 106 may store data indicating the phone numbers that correspond to devices of the wireless network of the server 106. If the calling device 104 places the call using a wireless network that is different than the server 106 and the server 106 determines the telephone number 116 belongs to its wireless network, then the server 106 may determine to block the telephone call without notifying the callee device. The server 106 may determine to transmit a notification of the telephone call to the callee device and include, in the notification, data indicating that the telephone call may be a spoof and/or fraudulent call.

In some implementations, the server 106 may identify an owner of the phone number 116. If the confidence value is below a threshold, then the server 106 may request, from the owner, confirmation that the name is accurate. If the owner confirms that the name is accurate, then the server 106 may generate the notification that includes the name and/or the telephone number 116 and transmit the notification to the callee phone. If the owner does not confirm that the name is accurate, then the server 106 may determine to block the telephone call without notifying the callee device. Alternatively, the server 106 may determine to transmit a notification of the telephone call to the callee device and include, in the notification, data indicating that the telephone call may be a spoof and/or fraudulent call.

Figure 4:
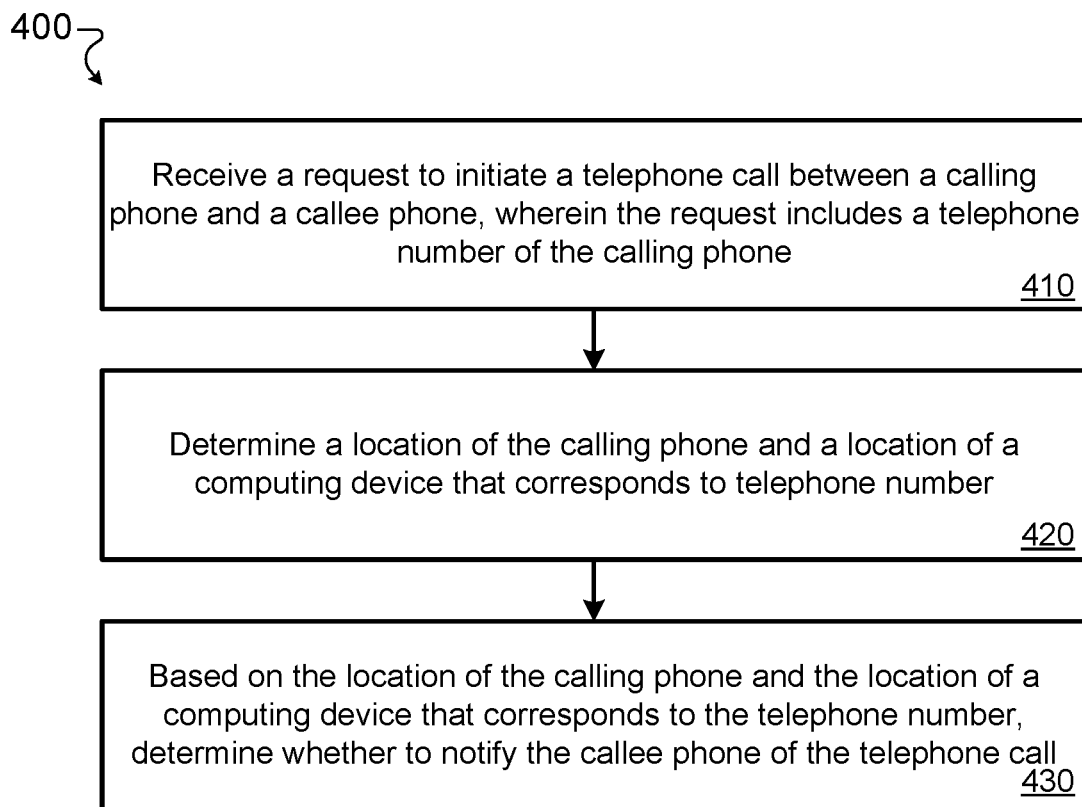
FIG. 4 is a flowchart of an example process for determining whether to complete a telephone call based on a location of the calling phone.

FIG. 4 is a flowchart of an example process 400 for determining whether to complete a telephone call based on a location of the calling phone. In general, the process 400 receives a request to initiate a telephone call. The process 400 determines a location of the calling phone and a location of the phone that corresponds to a phone number of the calling phone. Based on those two locations, the process 400 determines whether to transmit a notification of the telephone call to the callee phone. The process 400 will be described as being performed by the server 106 of FIG. 1 and will include references to other components in FIG. 1. In some implementations, the process 400 may be performed by the server 200 of FIG. 2.

The server 106 receives a request to initiate a telephone call between a calling phone 104 and a callee phone 110. The request includes a telephone number of the calling phone 104 (410). The calling phone 104 may include a telephone application with which the user 102 is able to interact to initiate a telephone call. The user 102 may dial the number of the callee phone 110, and the server 106 may receive the request to initiate the telephone call from the telephone application on the calling phone 104. The request may include the phone number of the callee phone 110 and the phone number of the calling phone 104.

The server 106 determines a location of the calling phone 104 and a location of a computing device that corresponds to telephone number (420). The server 106 may determine the location of the caller device 104 by identifying the base station with which the caller device 104 is communicating. In some instances, the server 106 may request location data from the caller device 104. The caller device 104 may provide the location data in response to the request or without first receiving the request.

Based on the location of the calling phone and the location of a computing device that corresponds to the telephone number, determine whether to notify the callee phone of the telephone call (430). The server 106 may determine a location of the calling device 104 and a location of a device that corresponds to the telephone number 116. If the two locations match, then the server 106 determine whether the name corresponds to the telephone number 116 using the techniques described above. If the two locations do not match because the two locations are greater than at threshold distance apart, then the server 106 may determine that the name does not match the telephone number 116. The server 106 may determine to block the telephone call without notifying the callee device. The server 106 may determine to transmit a notification of the telephone call to the callee device and include, in the notification, data indicating that the telephone call may be a spoof and/or fraudulent call.

In some implementations, the server 106 may receive a telephone call from a calling device that corresponds to a phone number. The server 106 may store data indicating active phone calls. The server 106 may determine that that phone number is participating in an active phone call. In this case, the server 106 may determine to block the telephone call without notifying the callee device. The server 106 may determine to transmit a notification of the telephone call to the callee device and include, in the notification, data indicating that the telephone call may be a spoof and/or fraudulent call.

Figure 5:
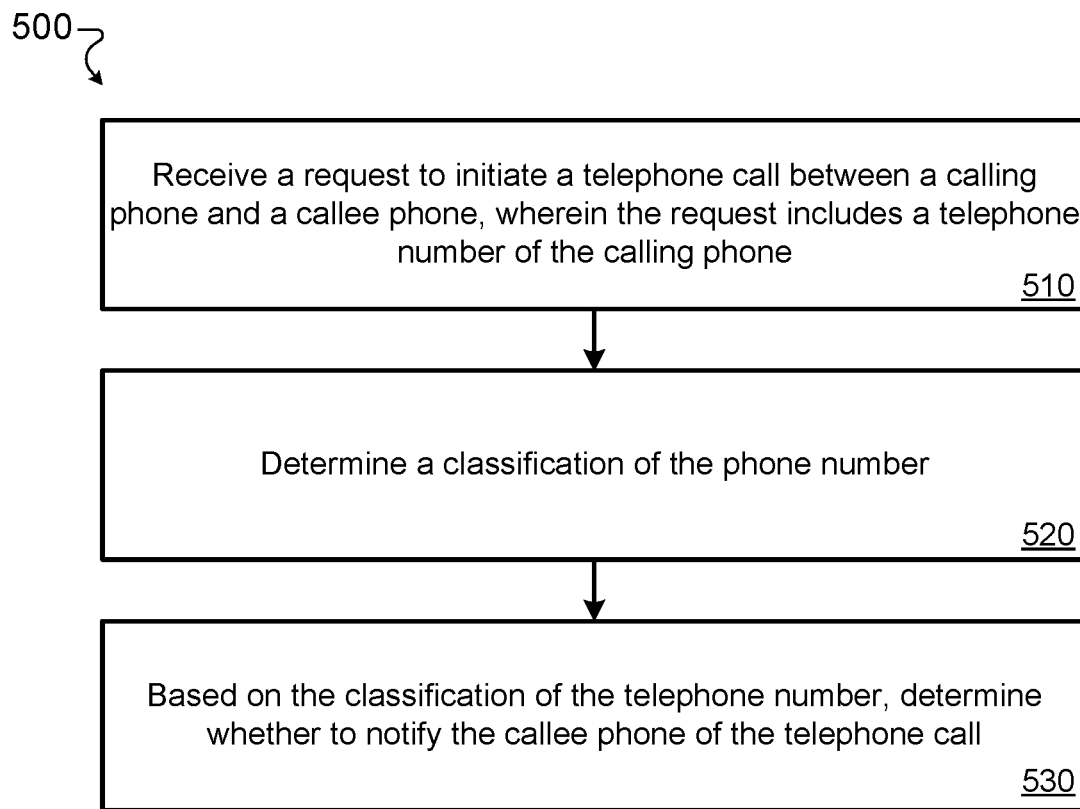
FIG. 5 is a flowchart of an example process for determining whether to complete a telephone call based on a classification of the calling phone.

FIG. 5 is a flowchart of an example process 500 for determining whether to complete a telephone call based on a classification of the calling phone. In general, the process 500 receives a request to initiate a telephone call. The process 500 determines a classification of the phone number of the calling phone. Based on the classification, the process 500 determines whether to transmit a notification of the telephone call to the callee phone. The process 500 will be described as being performed by the server 106 of FIG. 1 and will include references to other components in FIG. 1. In some implementations, the process 500 may be performed by the server 200 of FIG. 2.

The server 106 receives a request to initiate a telephone call between a calling phone 104 and a callee phone 110. The request includes a telephone number of the calling phone 110 (510). The calling phone 104 may include a telephone application with which the user 102 is able to interact to initiate a telephone call. The user 102 may dial the number of the callee phone 110, and the server 106 may receive the request to initiate the telephone call from the telephone application on the calling phone 104. The request may include the phone number of the callee phone 110 and the phone number of the calling phone 104.

The server 106 determines a classification of the phone number (520). In some instances, the classification may be preassigned to the phone number before the phone number is assigned to the current customer. The server 106 may assign a classification to a block of numbers. When a new customer is assigned a number, then the server 106 may select a phone number from the block of numbers that matches the classification of the new customer. Some classifications may include retail customer, commercial customer, industrial customer, personal user, and/or any other similar classification. Each of these classifications may correspond to a usage pattern. For example, commercial customers may receive and place ninety-five percent of their phone calls between 9 am and 5 pm on Monday through Friday. Personal users may receive and place fifty percent of their phone calls between 5 pm and 9 pm on Monday through Friday and on Saturday and Sunday between 12 pm and 8 pm.

Based on the classification of the telephone number, the server 106 determines whether to notify the callee phone of the telephone call (530). The server 106 may access the calling history 117 of the telephone number. The server 106 may compare the calling history 117 to the classification of the telephone number. If the calling history 117 does not exhibit usage that is consistent with the classification, then the server 106 may determine that the name in the caller identification data may not be accurate because the calling phone may be being used by a different person or entity than the original customer. In this case, the server 106 may determine to block the telephone call without notifying the callee device. The server 106 may determine to transmit a notification of the telephone call to the callee device and include, in the notification, data indicating that the telephone call may be a spoof and/or fraudulent call. In some implementations, the server 106 may determine to contact the original customer for additional information regarding whether the name in the caller information data is accurate.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
    assigning, by the server and to a customer, a telephone number that is associated with a classification that is associated with characteristics of the customer;
    receiving, by the server, a request to initiate a telephone call between a calling phone of the customer and a callee phone, wherein the request includes the telephone number; and
    based on the classification associated with the telephone number, determining, by the server, whether to notify the callee phone of the telephone call.

2. The method of claim 1, comprising:
    accessing, by the server, data that indicates classifications that have been preassigned to telephone numbers; and
    identifying, by the server, the telephone number and the classification in the data that indicates the classifications that have been preassigned to the telephone numbers.

3. The method of claim 1, wherein the classification associated with the telephone number indicates whether a customer assigned to the phone number is a retail business, commercial business, industrial business, or personal user.

4. The method of claim 1, comprising:
    based on the classification associated with the phone number, determining, by the server, a time range when a given customer associated with the classification typically places telephone calls; and
    comparing, by the server, the time range to a time that the telephone call was initiated,
    wherein determining whether to notify the callee phone is based further on comparing the time range to the time that the telephone call was initiated.

5. The method of claim 1, comprising:
    determining, by the server, a typical telephone usage of a given customer associated with the classification;
    accessing, by the server, telephone usage associated with the telephone number; and
    comparing, by the server, the typical telephone usage to the telephone usage associated with the telephone number,
    wherein determining whether to notify the callee phone is based further on comparing the typical telephone usage to the telephone usage associated with the telephone number.

6. The method of claim 1, comprising:
    determining, by the server, caller identification information of the phone number; and
    based on the classification associated with the telephone number, determining, by the server, a likelihood that the caller identification information of the telephone number is accurate,
    wherein determining whether to notify the callee phone is based further on the likelihood that the caller identification information of the telephone number is accurate.

7. A system, comprising:
    one or more processors; and
    memory including a plurality of computer-executable components that are executable by the one or more processors to perform a plurality of acts, the plurality of acts comprising:
        assigning, by the system and to a customer, a telephone number that is associated with a classification that is associated with characteristics of the customer;
        receiving, by the system, a request to initiate a telephone call between a calling phone of the customer and a callee phone, wherein the request includes the telephone number;
        based on the classification associated with the telephone number, determining, by the system, whether to notify the callee phone of the telephone call.

8. The system of claim 7, wherein the acts comprise:
    accessing, by the system, data that indicates classifications that have been preassigned to telephone numbers; and
    identifying, by the system, the telephone number and the classification in the data that indicates the classifications that have been preassigned to the telephone numbers.

9. The system of claim 7, wherein the classification associated with the telephone number indicates whether a customer assigned to the phone number is a retail business, commercial business, industrial business, or personal user.

10. The system of claim 7, wherein the acts comprise:
    based on the classification associated with the phone number, determining, by the system, a time range when a given customer associated with the classification typically places telephone calls; and
    comparing, by the system, the time range to a time that the telephone call was initiated,
    wherein determining whether to notify the callee phone is based further on comparing the time range to the time that the telephone call was initiated.

11. The system of claim 7, wherein the acts comprise:
    determining, by the system, a typical telephone usage of a given customer associated with the classification;
    accessing, by the system, telephone usage associated with the telephone number; and comparing, by the system, the typical telephone usage to the telephone usage associated with the telephone number, wherein determining whether to notify the callee phone is based further on comparing the typical telephone usage to the telephone usage associated with the telephone number.

12. The system of claim 7, wherein the acts comprise:

determining, by the system, caller identification information of the phone number; and based on the classification associated with the telephone number, determining, by the system, a likelihood that the caller identification information of the telephone number is accurate, wherein determining whether to notify the callee phone is based further on the likelihood that the caller identification information of the telephone number is accurate.

13. One or more non-transitory computer-readable media of a computing device storing computer-executable instructions that upon execution cause one or more computers to perform acts comprising:

assigning, by the one or more computers and to a customer, a telephone number that is associated with a classification that is associated with characteristics of the customer;

receiving, by the one or more computers, a request to initiate a telephone call between a calling phone of the customer and a callee phone, wherein the request includes the telephone number; and based on the classification of the telephone number, determining, by the one or more computers, whether to notify the callee phone of the telephone call.

14. The media of claim 13, wherein determining the classification of the telephone number comprises:

accessing, by the one or more computers, data that indicates classifications that have been preassigned to telephone numbers; and identifying, by the one or more computers, the telephone number and the classification in the data that indicates the classifications that have been preassigned to the telephone numbers.

15. The media of claim 13, wherein the classification associated with the telephone number indicates whether a customer assigned to the phone number is a retail business, commercial business, industrial business, or personal user.

16. The media of claim 13, wherein the acts comprise:

based on the classification associated with the phone number, determining, by the one or more computers, a time range when a given customer associated with the classification typically places telephone calls; and comparing, by the one or more computers, the time range to a time that the telephone call was initiated, wherein determining whether to notify the callee phone is based further on comparing the time range to the time that the telephone call was initiated.

17. The media of claim 13, wherein the acts comprise:

determining, by the one or more computers, a typical telephone usage of a given customer associated with the classification;

accessing, by the one or more computers, telephone usage associated with the telephone number; and comparing, by the one or more computers, the typical telephone usage to the telephone usage associated with the telephone number, wherein determining whether to notify the callee phone is based further on comparing the typical telephone usage to the telephone usage associated with the telephone number.

18. The media of claim 13, wherein the acts comprise:

determining, by the one or more computers, caller identification information of the phone number; and based on the classification associated with the telephone number, determining, by the one or more computers, a likelihood that the caller identification information of the telephone number is accurate, wherein determining whether to notify the callee phone is based further on the likelihood that the caller identification information of the telephone number is accurate.

\* \* \* \* \*